US011679342B2

(12) United States Patent
Asay et al.

(10) Patent No.: US 11,679,342 B2
(45) Date of Patent: Jun. 20, 2023

(54) GREASE INTERCEPTOR INLET CHAMBER

(71) Applicant: Schier Products Company, Shawnee, KS (US)

(72) Inventors: Tad Asay, Overland Park, KS (US); Connor O'Boyle, Olathe, KS (US); Benjamin F. Brown, Overland Park, KS (US); Grahm Heide, Overland Park, KS (US)

(73) Assignee: Schier Products Company, Shawnee, KS (US)

( * ) Notice: Subject to any disclaimer, the term of this patent is extended or adjusted under 35 U.S.C. 154(b) by 0 days.

(21) Appl. No.: 17/499,386

(22) Filed: Oct. 12, 2021

(65) Prior Publication Data

US 2022/0111311 A1    Apr. 14, 2022

Related U.S. Application Data

(60) Provisional application No. 63/090,474, filed on Oct. 12, 2020.

(51) Int. Cl.

| E03F 5/16 | (2006.01) |
| B01D 17/02 | (2006.01) |
| C02F 1/40 | (2023.01) |
| B01D 21/24 | (2006.01) |
| B01D 21/00 | (2006.01) |

(Continued)

(52) U.S. Cl.
CPC ...... B01D 17/0211 (2013.01); B01D 17/0214 (2013.01); B01D 21/0033 (2013.01); B01D 21/0042 (2013.01); B01D 21/0087 (2013.01); B01D 21/2444 (2013.01); C02F 1/40 (2013.01); E03F 5/16 (2013.01); C02F 2001/007 (2013.01); C02F 2101/32 (2013.01)

(58) Field of Classification Search
CPC ............ B01D 17/0211; B01D 17/0214; B01D 21/0033; B01D 21/0042; B01D 21/0087; B01D 21/2405; C02F 1/40; E03F 5/14; E03F 5/16
USPC ............. 210/519, 521, 532.1, 538, 540, 801
See application file for complete search history.

(56) References Cited

U.S. PATENT DOCUMENTS

| 2,763,335 A | * | 9/1956 | Janssen | .............. | B01D 17/0211 |
| | | | | | 210/538 |
| 3,933,654 A | * | 1/1976 | Middelbeek | ....... | B01D 17/0211 |
| | | | | | 210/521 |

(Continued)

Primary Examiner — Christopher Upton
(74) Attorney, Agent, or Firm — Hovey Williams LLP (57) ABSTRACT

A separation device configured to separate light and heavy components of an effluent mixture. The separation device includes a separation tank, an inlet discharge, an outlet diffuser, and a baffle. The separation tank includes a tank reservoir for containing the effluent mixture during separation, with light components configured to migrate upwardly toward a static water line and heavy components configured to sink adjacent the bottom. The inlet discharge is located within the tank reservoir to supply effluent mixture to the separation tank. The outlet diffuser is spaced from the inlet discharge and located within the tank reservoir to receive a heavy component of the effluent mixture after separation. The baffle is located within the tank reservoir to separate the inlet discharge from the outlet diffuser. The baffle presents a baffle opening adjacent the static water line.

19 Claims, 8 Drawing Sheets

(51) Int. Cl.
 *C02F 1/00* (2023.01)
 *C02F 101/32* (2006.01)

(56) References Cited

U.S. PATENT DOCUMENTS

| | | | | |
|---|---|---|---|---|
| 4,123,365 | A | * | 10/1978 | Middelbeek ....... B01D 17/0211 210/521 |
| 4,132,651 | A | * | 1/1979 | deJong ............... B01D 17/0211 210/522 |
| 4,396,508 | A | * | 8/1983 | Broughton ......... B01D 21/2405 210/522 |
| 4,422,931 | A | * | 12/1983 | Wolde-Michael ........................... B01D 17/0214 210/519 |
| 5,520,825 | A | * | 5/1996 | Rice ................... B01D 17/0211 210/519 |
| 5,993,646 | A | * | 11/1999 | Powers .................... E03F 5/16 210/538 |
| 7,481,321 | B2 | | 1/2009 | Ismert |
| 10,315,135 | B2 | | 6/2019 | Brown et al. |
| 2001/0027954 | A1 | * | 10/2001 | Broeders .................. E03F 5/16 210/519 |
| 2004/0222149 | A1 | * | 11/2004 | Abrams ............. B01D 17/0211 210/519 |
| 2010/0213119 | A1 | * | 8/2010 | Generes .................... E03F 5/14 210/538 |
| 2018/0037476 | A1 | | 2/2018 | Brown et al. |

\* cited by examiner

GREASE INTERCEPTOR INLET CHAMBER

CROSS-REFERENCE TO RELATED APPLICATIONS

The present application claims the priority benefit of U.S. Provisional Patent Application Ser. No. 63/090,474, filed Oct. 12, 2020, entitled GREASE INTERCEPTOR INLET CHAMBER, incorporated by reference in its entirety herein.

BACKGROUND

Field of the Invention

The present disclosure relates to methods, systems, and devices for use in gravity separation of components of an effluent mixture. Aspects of the present disclosure more particularly relate to an interceptor having a baffle within the tank reservoir to control the movement of effluent mixture within the reservoir.

Description of Related Art

Effluent separation units often treat streams containing three broad categories of components: (a) lighter-than-water component(s), (b) a water component, and (c) heavier-than-water component(s). A conventional separation unit separates out at least some of the non-water components as the stream flows between an input and an output of the unit. Exemplary non-water components include solids, sands, fats, oils, greases and the like. An example of an advanced existing separation unit is provided in U.S. Pat. No. 7,481,321, which is hereby incorporated herein by reference.

Prior art separation units are known to have certain deficiencies. For instance, conventional separation devices are known to provide incomplete separation of at least some non-water components. There is a need for an alternative to the standard designs that may be more easily maintained and constructed, while also providing an acceptable, and in some cases superior, degrees of separation and control of effluent streams.

SUMMARY

The following brief summary is provided to indicate the nature of the subject matter disclosed herein. While certain aspects of the present embodiments are described below, the summary is not intended to limit the scope of the present invention.

Embodiments of the present disclosure provide a separation device that does not suffer from the problems and limitations of prior art devices, including those set forth above.

In one or more embodiments, there is described a separation device configured to separate light and heavy components of an effluent mixture. The separation device broadly includes a separation tank, an inlet discharge, an outlet diffuser, and a baffle. The separation tank includes a bottom and a sidewall that at least partly define a tank reservoir for containing the effluent mixture during separation, with light components configured to migrate upwardly toward a static water line and heavy components configured to sink adjacent the bottom. The inlet discharge is located within the tank reservoir to supply effluent mixture to the separation tank. The outlet diffuser is spaced from the inlet discharge and located within the tank reservoir to receive a heavy component of the effluent mixture after separation. The baffle is located within the tank reservoir to separate the inlet discharge from the outlet diffuser, with the baffle at least partly defining a baffle chamber. The baffle presents a baffle opening adjacent the static water line, with the baffle chamber fluidly communicating with the rest of the tank reservoir via the baffle opening. The inlet discharge is positioned within the baffle chamber and located between the outlet diffuser and at least part of the baffle opening, with components of the mixture flow supplied by the inlet discharge advancing away from the outlet diffuser to reach the baffle opening and flowing toward the outlet diffuser after passing through the baffle opening.

In one or more embodiments, there is described a separation device configured to separate light and heavy components of an effluent mixture. The separation device broadly includes a separation tank, an inlet discharge, an outlet diffuser, a baffle, and a diverter plate. The separation tank includes a bottom and a sidewall that at least partly define a tank reservoir for containing the effluent mixture during separation, with light components configured to migrate upwardly toward a static water line and heavy components configured to sink adjacent the bottom. The inlet discharge is located within the tank reservoir to supply effluent mixture to the separation tank. The outlet diffuser is spaced from the inlet discharge and located within the tank reservoir to receive a heavy component of the effluent mixture after separation. The baffle is located within the tank reservoir to separate the inlet discharge from the outlet diffuser. The baffle presents a baffle opening adjacent the static water line to permit fluid flow from the inlet discharge toward the outlet diffuser. The diverter plate is mounted within the tank reservoir below the static water line and above the outlet diffuser. The diverter plate is located between the baffle opening and the outlet diffuser to direct downwardly moving components of the effluent mixture in a direction away from the outlet diffuser.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Preferred embodiments are described in detail below with reference to the attached drawing figures, wherein.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION

Figure 1:
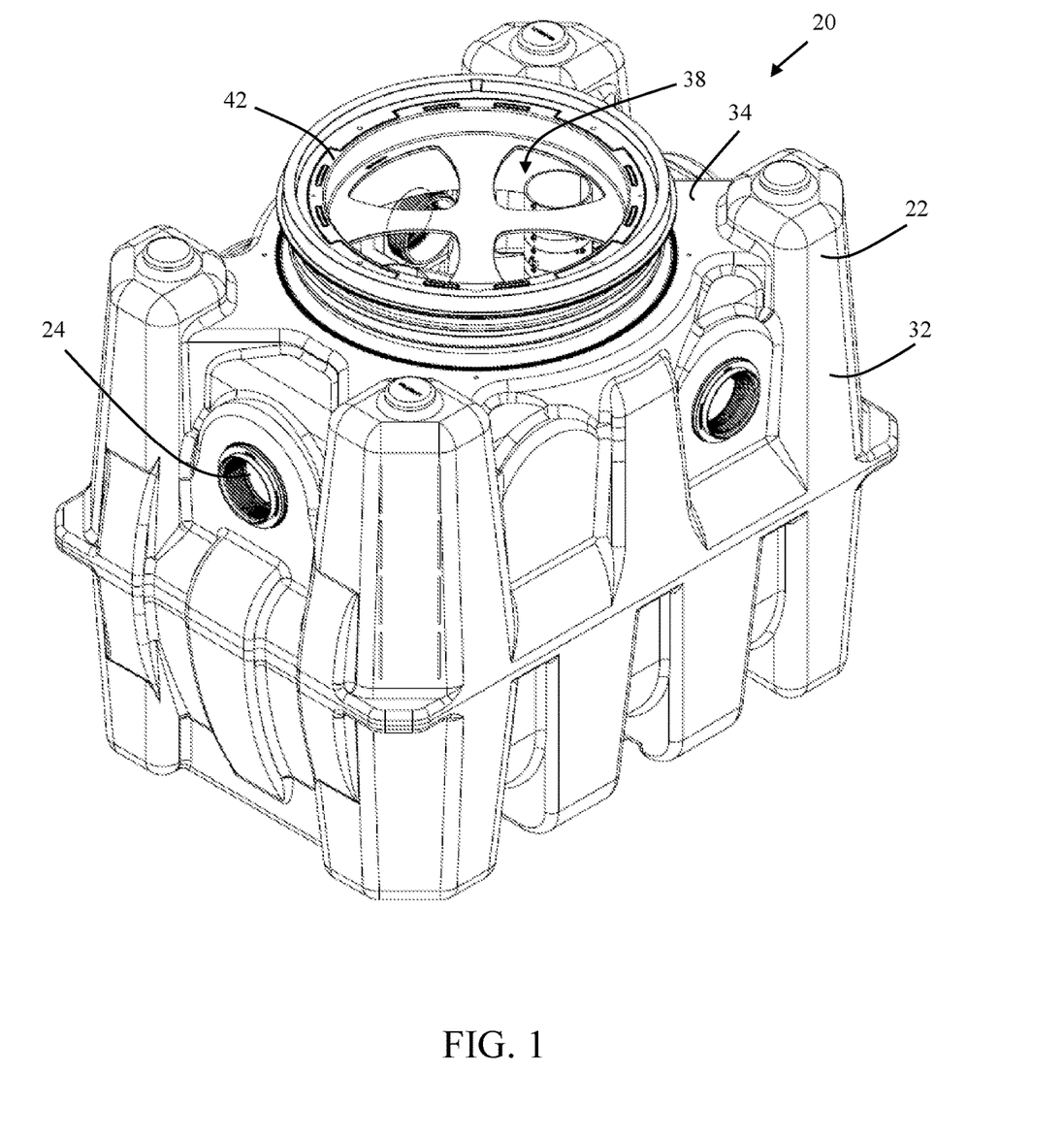
FIG. 1 is a perspective view of a separation device constructed in accordance with a preferred embodiment.
Figure 2:
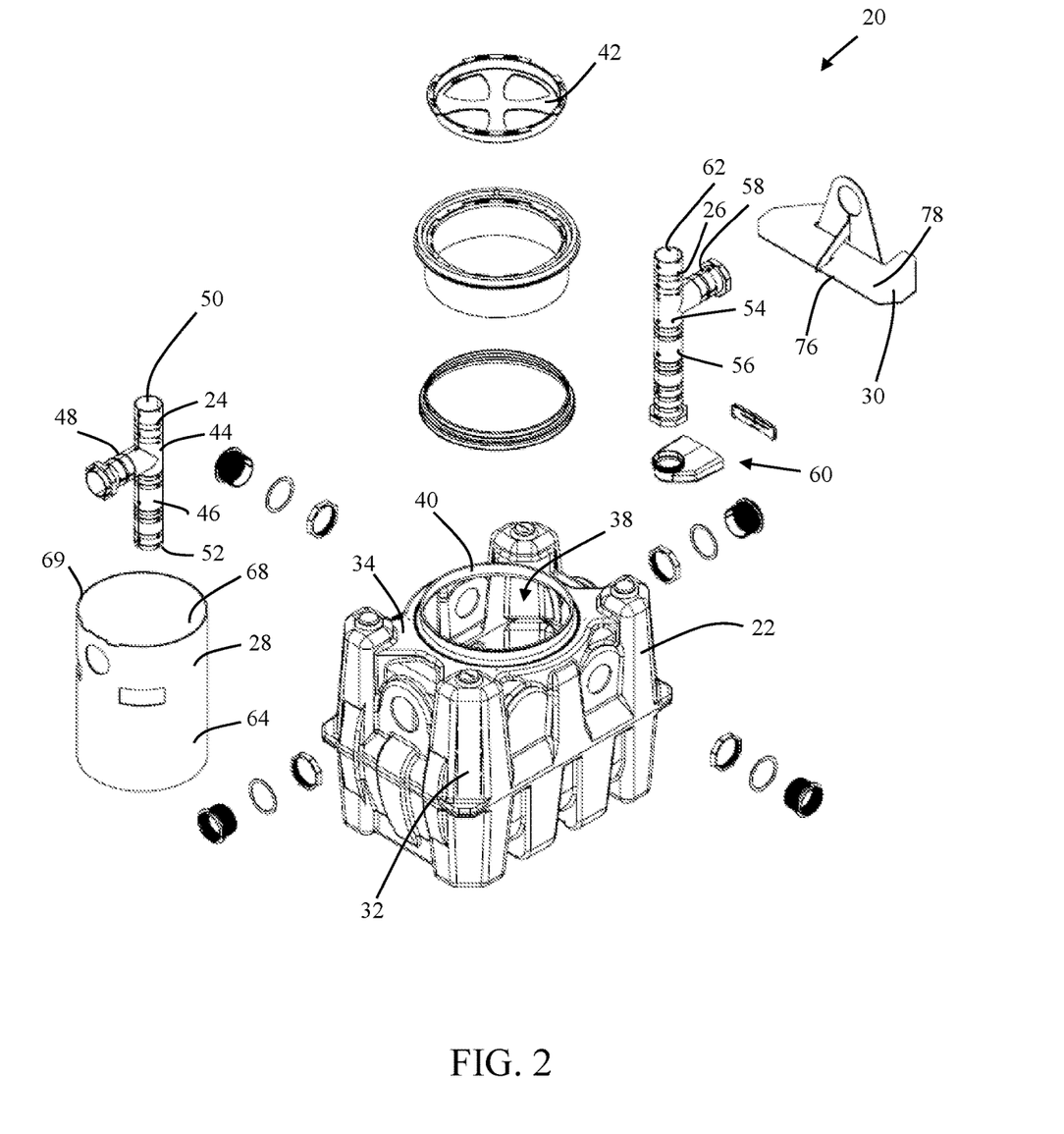
FIG. 2 is an exploded perspective view of the separation device depicted in FIG. 1, showing a tank, inlet, outlet, baffle, and diverter plate of the separation device.
Figure 3:
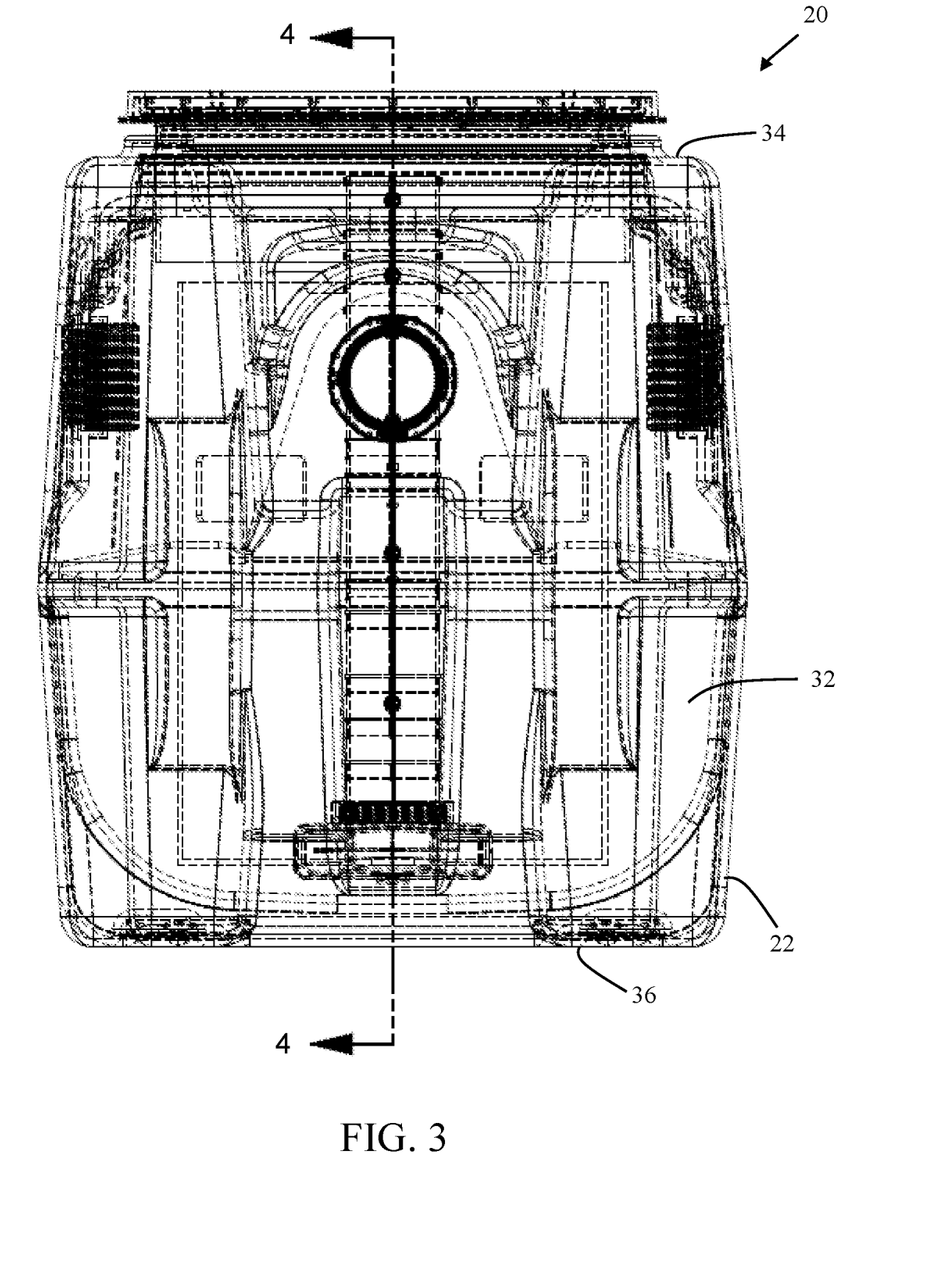
FIG. 3 is an end elevation view of the separation device depicted in FIGS. 1 and 2.

Turning initially to FIGS. 1 and 2, a separation device 20 is configured to separate components of an effluent mixture E including grease and/or solids and water or other similar density liquids. The illustrated separation device 20 may be in the form of a grease interceptor operable to separate the effluent mixture E. In general, the effluent mixture E may include water, lighter-than-water materials (such as grease) and/or heavier-than-water materials. The improved separation device 20 broadly includes a separation tank 22, an inlet 24, an outlet 26, a tubular baffle 28, and a diverter plate 30.

Figure 4:
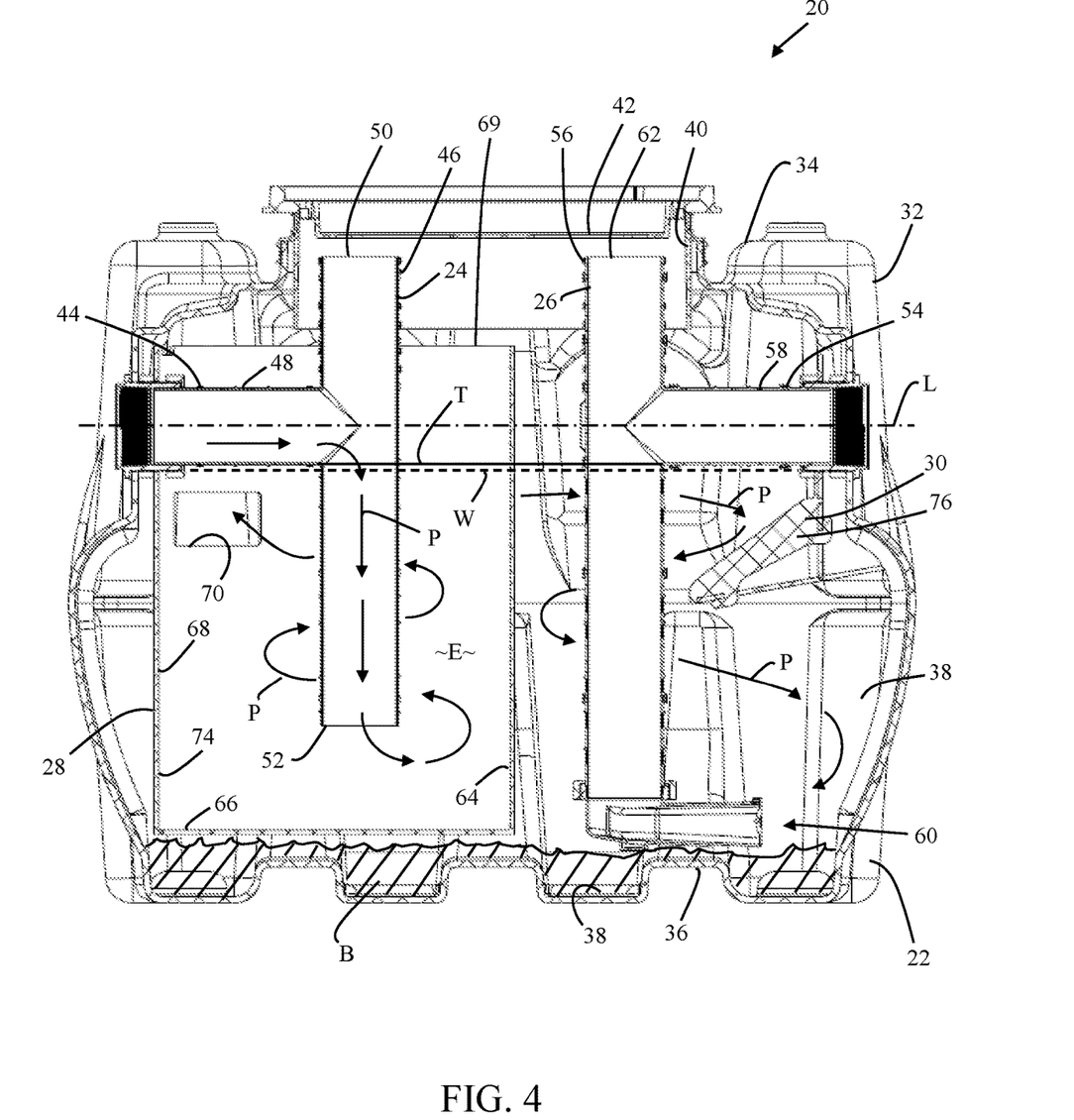
FIG. 4 is a cross-sectional view of the separation device taken along line 4-4 in FIG. 3, showing the inlet and outlet secured within a reservoir of the tank, with the baffle located within the tank to define a baffle chamber that receives effluent flow from the inlet, and further showing the diverter plate located above an outlet diffuser to divert effluent flow from the baffle.
Figure 5:
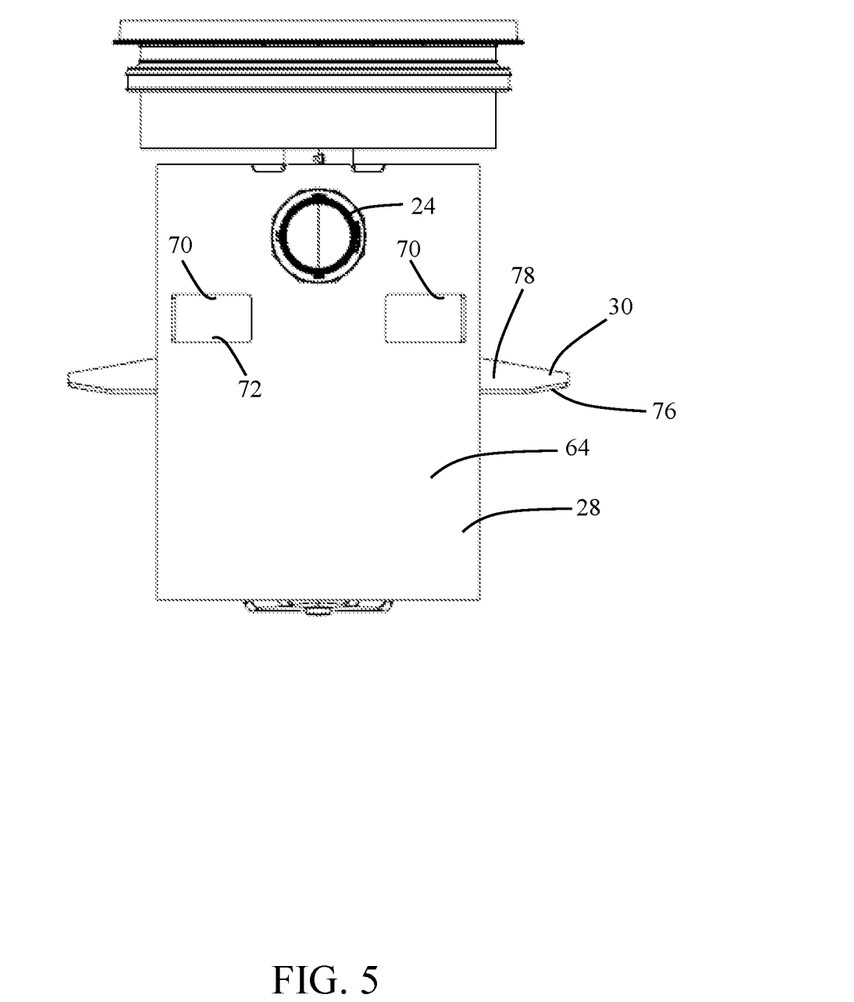
FIG. 5 is a fragmentary end elevation view of the separation device similar to FIG. 3, but with parts of the tank being removed to depict the tank lid, inlet, baffle, and diverter plate.
Figure 6:
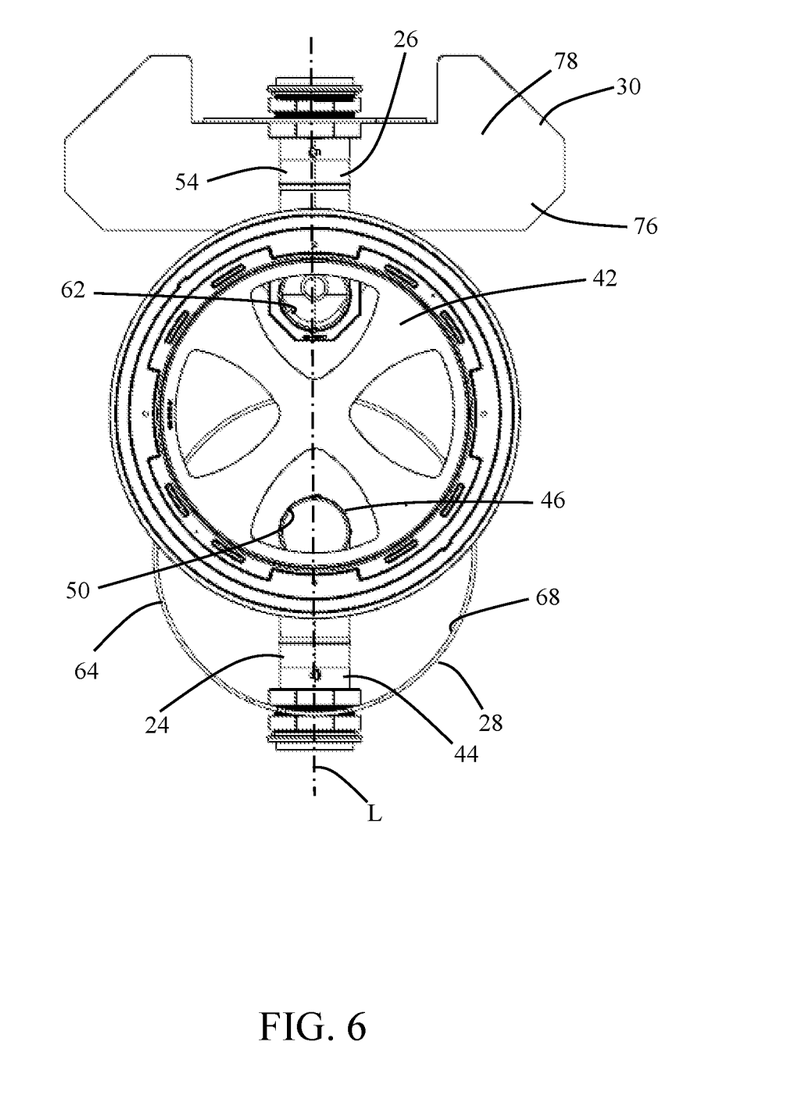
FIG. 6 is a fragmentary top view of the separation device depicted in FIGS. 1-5, showing the tank lid, inlet, outlet, baffle, and diverter plate.
Figure 7:
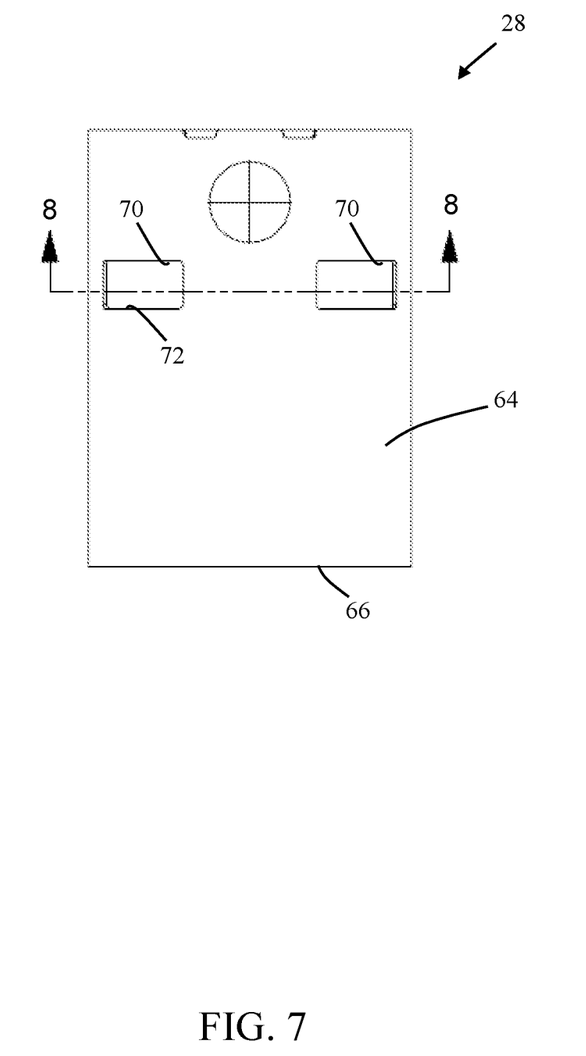
FIG. 7 is an end elevation of the baffle depicted in FIGS. 2 and 4-6, showing a baffle opening that permits effluent flow out of the baffle chamber and including a pair of generally rectangular slots.

Turning to FIGS. 1-4, the separation tank 22 includes a tank sidewall 32, a top 34, and a bottom 36 that cooperatively define a tank reservoir 38 for containing the mixture E during separation (see FIG. 4). The top 34 presents an access opening 40 and a removable lid 42 configured to span the access opening 40.

In the illustrated embodiment, the tank 22 defines a longitudinal axis L (see FIG. 4) extending between opposite outboard ends of the tank 22. The inlet 24 and outlet 26 are generally aligned with the longitudinal axis L and each extend inboard from a respective outboard end of the tank 22. Components of the effluent mixture E, particularly water, generally flow along a path P (see FIG. 4) from an effluent source (not shown), through the inlet 24, across the reservoir 38, and out through the outlet 26, which fluidly communicates with an effluent drain such as a sewer (not shown).

A passive gravity separation process occurs during the effluent mixture's progression across the reservoir 38 from the inlet 24 to the outlet 26. The passive separation process is distinguished from active separation processes that require pumps and/or other moving parts to effect separation of the effluent stream. In the separation process, one or more light components (such as oil, grease, etc.) buoyantly migrate to a top layer T along a static water line W (see FIG. 4). At the same time, one or more heavy components (such as fragments of dirt, metal, etc.) may sink to a bottom layer B (see FIG. 4) adjacent the bottom 36 of the tank 22. In certain embodiments, the separation process is a hydromechanical separation process, which may comprise a gravity separation process aided by flow control, air entrapment, interior baffles (e.g., as described herein), and the like. In certain such embodiments, separation device may therefore be considered a hydromechanical interceptor as defined in ASME A112.14.3-2018.

In the depicted embodiment, inlet 24 is located within the reservoir 38 and includes an inlet conduit 44 (see FIG. 2) coupled relative to the tank sidewall 32. Inlet conduit 44 extends within the tank 22 and includes an upright conduit section 46 and a lateral conduit section 48 that fluidly communicate with each other (see FIG. 4). The inlet conduit 44 also presents an inlet inspection port 50 and an inlet discharge 52. Preferably, the inlet discharge 52 is located within the tank reservoir 38 below the water line W to supply effluent mixture E to the tank 22.

Conduit sections 46, 48 of the inlet conduit 44 comprise tubular piping, with the lateral conduit section 48 intersecting a respective part of the tank sidewall 32. The upright conduit section 46 of the inlet conduit 44 extends above the lateral conduit section 48 to present the inlet inspection port 50 and below the lateral conduit section 48 to present the inlet discharge 52.

The outlet 26 is also located within the reservoir 38 and includes an outlet conduit 54 coupled relative to the tank sidewall 32. Outlet conduit 54 extends within the tank 22 and includes with an upright conduit section 56 and a lateral conduit section 58 that fluidly communicate with each other. The outlet conduit 54 also presents an outlet diffuser 60 and an outlet inspection port 62. Preferably, the outlet diffuser 60 is spaced from the inlet discharge 52 and located within the tank reservoir 38 below the water line W to receive a heavy component of the effluent mixture after separation.

Conduit sections 56, 58 of the outlet conduit 54 also comprise tubular piping, with the lateral conduit section 58 intersecting a respective part of the tank sidewall 32. The upright conduit section 56 of the outlet conduit 54 extends above the lateral conduit section 58 to present the outlet inspection port 62 and below the lateral conduit section 58 to present the outlet diffuser 60.

Referring to FIGS. 4-8, tubular baffle 28 is preferably located within the tank reservoir 38 to act as an inlet chamber and control and direct the movement of effluent mixture within the larger reservoir 38. The baffle 28 also serves to separate the inlet discharge 52 from the outlet diffuser 60.

In the illustrated embodiment, baffle 28 includes a tubular baffle sidewall 64 and an end cap 66 (see FIG. 4). The baffle sidewall 64 is generally tubular and preferably comprises a cylindrical tube with opposite upper and lower ends. Baffle sidewall 64 and end cap 66 cooperatively present a baffle chamber 68. Baffle sidewall 64 also presents an open top 69, which is located above the water line W (see FIG. 4) and fluidly communicates with the baffle chamber 68. The end cap 66 is located below the water line W to enclose the lower end of the baffle chamber 68. The depicted sidewall 64 extends continuously between the closed lower end of the baffle 28 and the open upper end of the baffle 28 and presents a generally circular cross-sectional shape.

Baffle sidewall 64 also presents a pair of slots 70 located in an upper half of the sidewall 64. Slots 70 cooperatively provide a baffle opening 72 adjacent the static water line W. As described below, the baffle chamber 68 fluidly communicates with the rest of the tank reservoir 38 via the baffle opening 72.

Slots 70 are spaced below the static water line W (which is generally at about the same level as the bottom of the lateral conduit sections 48, 58), and may be in the form of rectangular slots that are generally horizontally oriented. As will be explained, the slots 70 permit fluid flow from the baffle chamber 68 to the reservoir 38 outside the baffle chamber 68.

Although the depicted baffle opening is preferred, an alternative baffle may be provided with other baffle opening configurations. For instance, an alternative baffle opening may include an alternative number of slots (e.g., a single slot or more than two slots). Also in alternative embodiments, one or more slots may be alternatively shaped (e.g., circular) and/or alternatively positioned on the baffle.

Preferably, the baffle opening 72 comprises the only opening in the baffle 28 below the static water line W to provide fluid communication between the baffle chamber and the rest of the tank reservoir 38. Furthermore, the baffle opening 72 is preferably located entirely in an outboard half of the baffle sidewall 64 to facilitate separation of non-water components from the effluent. However, it also within the scope of certain aspects of the present invention for alternative device embodiments to include one or more alternatively positioned baffle openings.

Figure 8:
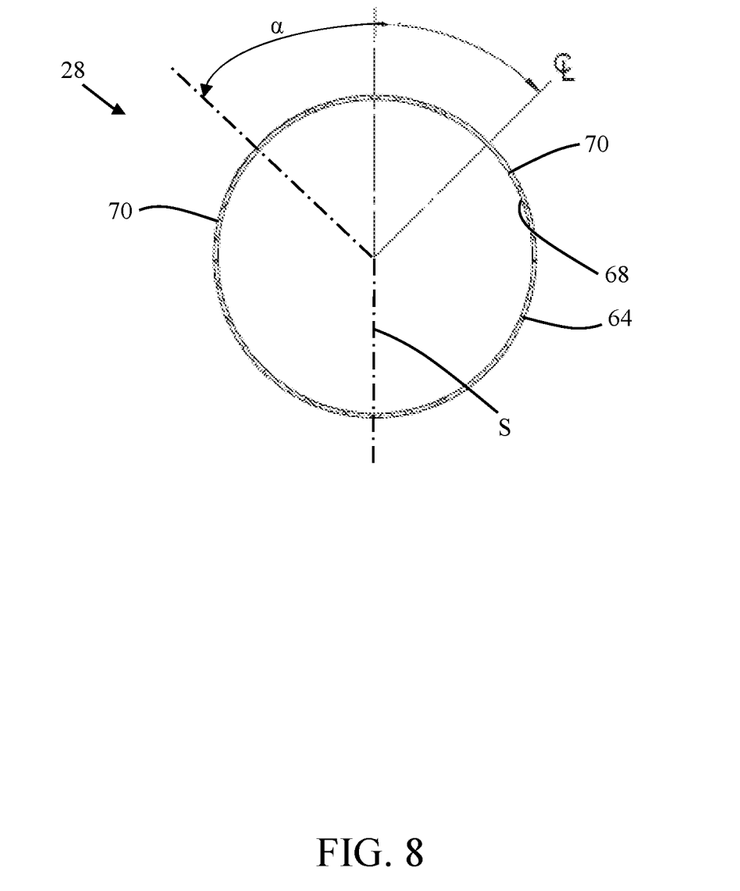
FIG. 8 is a cross-sectional view of the baffle taken along line 8-8 in FIG. 7, showing the angular separation of the slots.

The depicted slots 70 are preferably spaced apart from one another and define a line of symmetry S (see FIG. 8). The illustrated slots 70 are circumferentially spaced to define a slot spacing angle α (see FIG. 8) measured between the axial center lines of the slots 70. The slot spacing angle α preferably ranges from about forty-five degrees (45°) to about one hundred eighty degrees (180°) and, more preferably, from about sixty degrees (60°) to about one hundred twenty degrees (120°). Most preferably, the spacing angle is about ninety degrees (90°).

Slots 70 are preferably located in an upper half of the baffle 28 and spaced above the inlet discharge 52 to facilitate separation of non-water components from effluent flow prior to advancement of effluent flow out of the baffle chamber 68. It will be appreciated that the slots may be variously sized to provide efficient operation of the separator device. Alternative baffle embodiments may include one or more slots that are at least partly located in the upper half and/or the lower half of the baffle sidewall. In one or more embodiments, at least one slot may extend substantially along the entire vertical axial length of the baffle sidewall.

Slots 70 are preferably oriented along the baffle perimeter so that the line of symmetry is generally parallel to the longitudinal axis L. In this manner, effluent discharged from the baffle 28 may flow around opposite sides of the baffle 28. Furthermore, because the baffle opening 72 is preferably located entirely in an outboard half of the baffle sidewall 64, the depicted slots 70 generally face away from the outlet 26. However, for at least certain aspects, one or more slots may be alternatively positioned along the perimeter of the baffle (e.g., where one or more slots face toward the outlet). The baffle opening 72 and inlet discharge 52 are preferably relatively positioned so that the inlet discharge 52 is located entirely between the outlet diffuser 60 and the baffle opening 72.

While the tubular sidewall is depicted as having a cylindrical shape, alternative embodiments of the sidewall may be otherwise shaped. In one or more embodiments, the tubular sidewall may present an alternative cross-sectional geometrical shape (e.g., oval, polygonal, etc.).

In one or more embodiments, the baffle sidewall may not be tubular. Alternative embodiments of the baffle sidewall may have a channel shape with a pair of vertically extending end margins spaced apart from each other for attachment to another structure (such as the tank sidewall) within the tank reservoir. For example, the end margins of a channel-shaped sidewall may be attached to the tank sidewall so that the baffle and tank sidewalls cooperatively surround and define the baffle chamber.

Still referring to FIGS. 4-8, the illustrated baffle 28 is located within the tank reservoir 38 to control the flow of effluent mixture E, particularly to facilitate separation of grease from the mixture E. The baffle 28 is preferably configured and positioned to surround the inlet conduit 44 so that the upright and lateral conduit sections 46, 48 of the inlet conduit 44 are received by the baffle chamber 68.

The depicted inlet discharge 52 is preferably positioned within a lower half of the baffle chamber 68 and faces downwardly toward the end cap 66. Thus, effluent mixture E is discharged in a generally downward direction into the baffle chamber 68 from the inlet discharge 52.

In the illustrated embodiment, inlet discharge 52 is preferably located between the outlet diffuser 60 and at least part of the baffle opening 72. As the mixture E is supplied into the baffle chamber 68, components of the mixture flow are generally advanced away from the outlet diffuser 60 to reach the baffle opening 72. Once the mixture flow passes through the baffle opening 72, the separation device 20 permits the mixture flow to advance toward the outlet diffuser 60.

Once introduced into the baffle chamber 68, at least some of the effluent mixture E generally swirls around the upright conduit section 46 and along an inner surface 74 of the cylindrical sidewall 64 without escaping the baffle chamber 68 (see FIG. 4). Grease components of the mixture E (or other light components) generally migrate upwardly toward the water line W. In the usual manner, grease tends to collect along the water line W and form the top layer T. As relatively light portions of the mixture E, such as grease, migrate upwardly toward the water line W, the slots 70 permit mixture components to flow out of the baffle chamber 68 along a path P toward the outlet 26.

In the illustrated configuration, the baffle 28 preferably restricts the discharged mixture E, particularly grease, from advancing in a direct line from the inlet discharge 52 to the outlet diffuser 60. The baffle 28 limits the mixture E from quickly escaping the baffle chamber 68, increases residence time within the chamber 68, and instead forces the mixture E to travel a relatively longer path toward the outlet 26. This baffle configuration enables grease to be separated out from the rest of the mixture E prior to reaching the outlet 26. Specifically, grease is more effectively separated out of the mixture E as the mixture E swirls within the chamber 68 and then eventually exits the chamber 68 through the slots.

Further separation of grease from the mixture E occurs as the mixture travels from adjacent the slots 70, across the reservoir, toward the outlet side of the tank 22. More particularly, to reach the outlet side of the tank 22, a flow of mixture E must travel from locations outboard of the slots 70 around the perimeter of the baffle 28. As the mixture flows about the baffle 28 and passes between the baffle 28 and adjacent portions of the tank sidewall 32, the mixture E may swirl within the reservoir 38, with grease being separated out.

Although the configuration of the illustrated baffle 28 is preferred, it is within the ambit of certain aspects for the separation device to include alternative baffle features. For instance, as noted above, the baffle sidewall may be alternatively configured to at least partly define the baffle chamber. Alternative baffle configurations may provide a baffle opening that generally faces away from the outlet (e.g., to facilitate a swirling flow of effluent through the tank reservoir). Although the baffle sidewall presents inner and outer sidewall surfaces that are generally smooth and continuous, alternative baffle embodiments may include features (such as vanes, flutes, fins, etc.) supported on or relative to the sidewall to promote swirling movement of effluent within the baffle chamber or outside of the baffle chamber.

The diverter plate 30 is configured to engage the mixture E within the reservoir 38 and restrict some portions of the mixture E from flowing toward the outlet diffuser 60. The diverter plate 30 includes a generally planar plate structure 76 mounted adjacent the outlet 26. The plate structure 76 presents an upper diverter surface 78 that extends in a direction transverse to the longitudinal axis L extending between the inlet discharge 52 and the outlet diffuser 60 (see FIGS. 5 and 6). The upper diverter surface 78 preferably comprises a planar surface that slopes downwardly in an inboard direction away from the outlet diffuser 60. Alternative embodiments of the diverter plate may include alternatively shaped elements (such as an alternative diverter surface) for diverting effluent flow (e.g., for directing effluent away from the outlet diffuser). For instance, the diverter plate may include one or more curved surface elements (e.g., convex and/or concave surfaces) for smoothly diverting effluent flow.

In the illustrated embodiment, diverter plate 30 is located below the static water line W and above the outlet diffuser 60. Furthermore, diverter plate 30 is located between the baffle opening 72 and the outlet diffuser 60. Preferably, at least part of the diverter surface 78 is located below the baffle opening 72 and overlies the outlet diffuser 60 to engage downwardly moving components of the effluent flow. Again, the diverter plate 30 also preferably slopes downwardly in the inboard direction. As portions of the mixture E located above the plate 30 advance downwardly toward the outlet diffuser 60, the upper surface 78 of diverter plate 30 directs the mixture E laterally inboard in a direction away from the outlet diffuser 60. As a result, the diverter plate 30 forces the mixture E to travel a relatively long path P toward the outlet diffuser 60.

The configuration of the diverter plate 30 enables grease to be separated out from the rest of the mixture E prior to reaching the outlet 26. Similar to mixture flow within the baffle 28, grease is separated out of the mixture E as the mixture E swirls within the reservoir 38. As the diverter plate 30 redirects mixture E inboard away from the outlet 26, the mixture E swirls and then gradually advances toward the outlet diffuser 60. Again, this configuration increases the residence time of the mixture E within the reservoir 38 and extends the path P the mixture travels through the tank 22 to the outlet diffuser 60.

It should be understood that the separation device, in accordance with one or more embodiments, may have a variety of sizes and geometries other than those expressly shown and described herein. It should still further be understood that the separation device in accordance with certain embodiments may be formed of a variety of suitable materials, including polymers or plastics, metals, composites, and the like (e.g., fiberglass reinforced composites, etc.) using any suitable method for preparing the structures described herein. In one construction, the separation device is molded from high density polyethylene to inhibit corrosion and leaking.

Although the figures and above description present features of preferred embodiments of the present inventive concept, other preferred embodiments may also be created in keeping with the principles of the invention. Furthermore, these other preferred embodiments may in some instances be realized through a combination of features compatible for use together despite having been presented independently in the above description.

Furthermore, unless otherwise specified, any directional references (e.g., upper, lower, above, below, etc.) are used herein solely for the sake of convenience and should be understood only in relation to each other. For instance, a component might in practice be oriented such that faces referred to as "upper" and "lower" are sideways, angled, inverted, etc. relative to the chosen frame of reference.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

As used herein, the term "includes" may refer to an item that includes something as a part thereof or is entirely made up of that something.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A separation device configured to separate light and heavy components of an effluent mixture, said separation device comprising:
    a separation tank including a bottom and a tank sidewall that at least partly define a tank reservoir for containing the effluent mixture during separation, with light components configured to migrate upwardly toward a static water line and heavy components configured to sink adjacent the bottom;

an inlet discharge located within the tank reservoir to supply effluent mixture to the separation tank;

an outlet diffuser spaced from the inlet discharge and located within the tank reservoir to receive a heavy component of the effluent mixture after separation; and a baffle located within the tank reservoir to separate the inlet discharge from the outlet diffuser, with the baffle at least partly defining a baffle chamber, said baffle presenting a baffle opening adjacent the static water line, with the baffle chamber fluidly communicating with the rest of the tank reservoir via the baffle opening, said inlet discharge being positioned within the baffle chamber and located between the outlet diffuser and at least part of the baffle opening, with components of the mixture flow supplied by the inlet discharge advancing away from the outlet diffuser to reach the baffle opening and flowing toward the outlet diffuser after passing through the baffle opening.

2. The separation device as claimed in claim 1, said baffle defining the baffle chamber, with the baffle opening comprising one or more slots being the only openings in the baffle below the static water line to provide fluid communication between the baffle chamber and the rest of the tank reservoir.

3. The separation device as claimed in claim 2, said inlet discharge being located entirely between the outlet diffuser and the baffle opening.

4. The separation device as claimed in claim 2, said baffle including a tubular baffle sidewall and a lower end cap, said baffle sidewall extending continuously about the baffle chamber and presenting an open top located above the static water line, said lower end cap being located below the static water line to enclose a lower end of the baffle chamber.

5. The separation device as claimed in claim 4, said baffle sidewall comprising a generally cylindrical body.

6. The separation device as claimed in claim 4, said baffle opening including a pair of slots spaced apart from one another along a perimeter of the baffle sidewall, with the slots generally facing away from the outlet diffuser.

7. The separation device as claimed in claim 1, further comprising:

an outlet conduit coupled relative to the tank sidewall and extending within the separation tank to present the outlet diffuser, with the outlet diffuser being located adjacent the bottom.

8. The separation device as claimed in claim 1, further comprising:

an inlet conduit coupled relative to the tank sidewall and extending within the separation tank to present the inlet discharge.

9. The separation device as claimed in claim 1, further comprising:

a diverter plate mounted within the tank reservoir below the static water line and above the outlet diffuser, said diverter plate being located between the baffle opening and the outlet diffuser to direct downwardly moving components of the effluent mixture in a direction away from the outlet diffuser.

10. The separation device as claimed in claim 9, said diverter plate presenting a fluid-engaging upper surface that overlies the outlet diffuser to engage the downwardly moving components, with at least part of the upper surface being located below the baffle opening.

11. The separation device as claimed in claim 10, said upper surface comprising a planar surface that slopes downwardly in a direction away from the outlet diffuser.

12. A separation device configured to separate light and heavy components of an effluent mixture, said separation device comprising:

a separation tank including a bottom and a tank sidewall that at least partly define a tank reservoir for containing the effluent mixture during separation, with light components configured to migrate upwardly toward a static water line and heavy components configured to sink adjacent the bottom;

an inlet discharge located within the tank reservoir to supply effluent mixture to the separation tank;

an outlet diffuser spaced from the inlet discharge and located within the tank reservoir to receive a heavy component of the effluent mixture after separation;

a baffle located within the tank reservoir to separate the inlet discharge from the outlet diffuser, said baffle presenting a baffle opening comprising one or more slots adjacent the static water line to permit fluid flow from the inlet discharge toward the outlet diffuser, said baffle defining a baffle chamber, with the baffle opening being the only opening located below the static water line to provide fluid communication between the inlet discharge and the outlet diffuser, said inlet discharge being located entirely between the outlet diffuser and the baffle opening; and a diverter plate mounted within the tank reservoir below the static water line and above the outlet diffuser, said diverter plate being located between the baffle opening and the outlet diffuser to direct downwardly moving components of the effluent mixture in a direction away from the outlet diffuser.

13. The separation device as claimed in claim 12, said diverter plate presenting a fluid-engaging upper surface that overlies the outlet diffuser to engage the downwardly moving components.

14. The separation device as claimed in claim 13, said upper surface comprising a planar surface that slopes downwardly in a direction away from the outlet diffuser.

15. The separation device as claimed in claim 12, said baffle including a tubular baffle sidewall and a lower end cap that cooperatively define a baffle chamber, said baffle sidewall extending continuously about the baffle chamber and presenting an open top located above the static water line, said lower end cap being located below the static water line to enclose a lower end of the baffle chamber.

16. The separation device as claimed in claim 15, said baffle sidewall comprising a generally cylindrical body.

17. The separation device as claimed in claim 15, said baffle opening including a pair of slots spaced apart from one another along a perimeter of the baffle sidewall, with the slots generally facing away from the outlet diffuser.

18. The separation device as claimed in claim 12, further comprising:

an outlet conduit coupled relative to the tank sidewall and extending within the separation tank to present the outlet diffuser, with the outlet diffuser being located adjacent the bottom; and an inlet conduit coupled relative to the tank sidewall and extending within the separation tank to present the inlet discharge.

19. A separation device configured to separate light and heavy components of an effluent mixture, said separation device comprising:

a separation tank including a bottom and a tank sidewall that at least partly define a tank reservoir for containing the effluent mixture during separation, with light components configured to migrate upwardly toward a static water line and heavy components configured to sink adjacent the bottom;

an inlet discharge located within the tank reservoir to supply effluent mixture to the separation tank;

an outlet diffuser spaced from the inlet discharge and located within the tank reservoir to receive a heavy component of the effluent mixture after separation;

a baffle located within the tank reservoir to separate the inlet discharge from the outlet diffuser, said baffle presenting a baffle opening comprising one or more slots adjacent the static water line to permit fluid flow from the inlet discharge toward the outlet diffuser, said baffle defining a baffle chamber, with the baffle opening being the only opening located below the static water line to provide fluid communication between the inlet discharge and the outlet diffuser, said baffle including a tubular baffle sidewall and a lower end cap that cooperatively define a baffle chamber, said baffle sidewall extending continuously about the baffle chamber and presenting an open top located above the static water line, said lower end cap being located below the static water line to enclose a lower end of the baffle chamber; and a diverter plate mounted within the tank reservoir below the static water line and above the outlet diffuser, said diverter plate being located between the baffle opening and the outlet diffuser to direct downwardly moving components of the effluent mixture in a direction away from the outlet diffuser.

* * * * *